United States Patent [19]

Church et al.

[11] Patent Number: 5,283,833
[45] Date of Patent: Feb. 1, 1994

[54] METHOD AND APPARATUS FOR SPEECH PROCESSING USING MORPHOLOGY AND RHYMING

[75] Inventors: Kenneth W. Church; Cecil H. Coker, both of Chatham, N.J.

[73] Assignee: AT&T Bell Laboratories, Murray Hill, N.J.

[21] Appl. No.: 762,289

[22] Filed: Sep. 19, 1991

[51] Int. Cl.⁵ .............................................. G01L 5/00
[52] U.S. Cl. ........................................ 381/41; 381/43
[58] Field of Search ................... 381/41, 43, 44, 52; 364/419

[56] References Cited

U.S. PATENT DOCUMENTS 4,692,941  9/1987  Jacks et al. ............................. 381/52
4,964,167  10/1990  Kunizawa et al. ..................... 381/52

OTHER PUBLICATIONS

"Using an on-line dictionary to find thymine words and pronunciations for unknown words" by Byrd et al. Association of ComputationLinguistics pp. 277–283, 1985 (Proceedings of the Conference Jul. 8–12, 1985).

D. H. Klatt, "Review of text-to-speech conversion for English," *J. Acoust. Soc. Am.*, vol. 82(3), pp. 737–793 (Sep. 1987).

*Primary Examiner*—Dale M. Shaw
*Assistant Examiner*—Kee M. Tung
*Attorney, Agent, or Firm*—Jason Paul DeMont

[57] ABSTRACT

A method and apparatus for natural language processing using morphology and rhyming. The method and apparatus employ a hybrid of dictionary and rule-based approaches for both speech and speech recognition. In an illustrative embodiment of the present invention the pronunciation of a word is determined by rhyming the word, or components of the word, with a reference word, or components of the reference word. In another illustrative embodiment of the present invention, the spelling of a word is determined by rhyming the word, or components of the word, with a reference word, or components of the reference word.

3 Claims, 5 Drawing Sheets

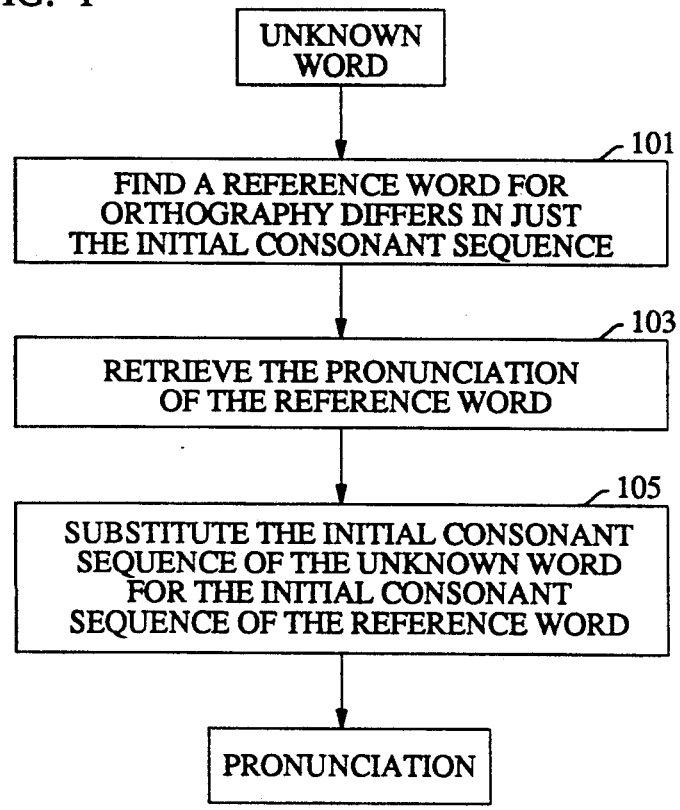

| 401 | 402 |
|---|---|
| /'trō-piz-ēm/ | tropism |
| /'träth/ | troth |
| /'trät-līn/ | trotline |
| /'trät-skē/ | trotsky |
| /'trät-ēr/ | trotter |
| /'traĕb-ēl/ | trouble |

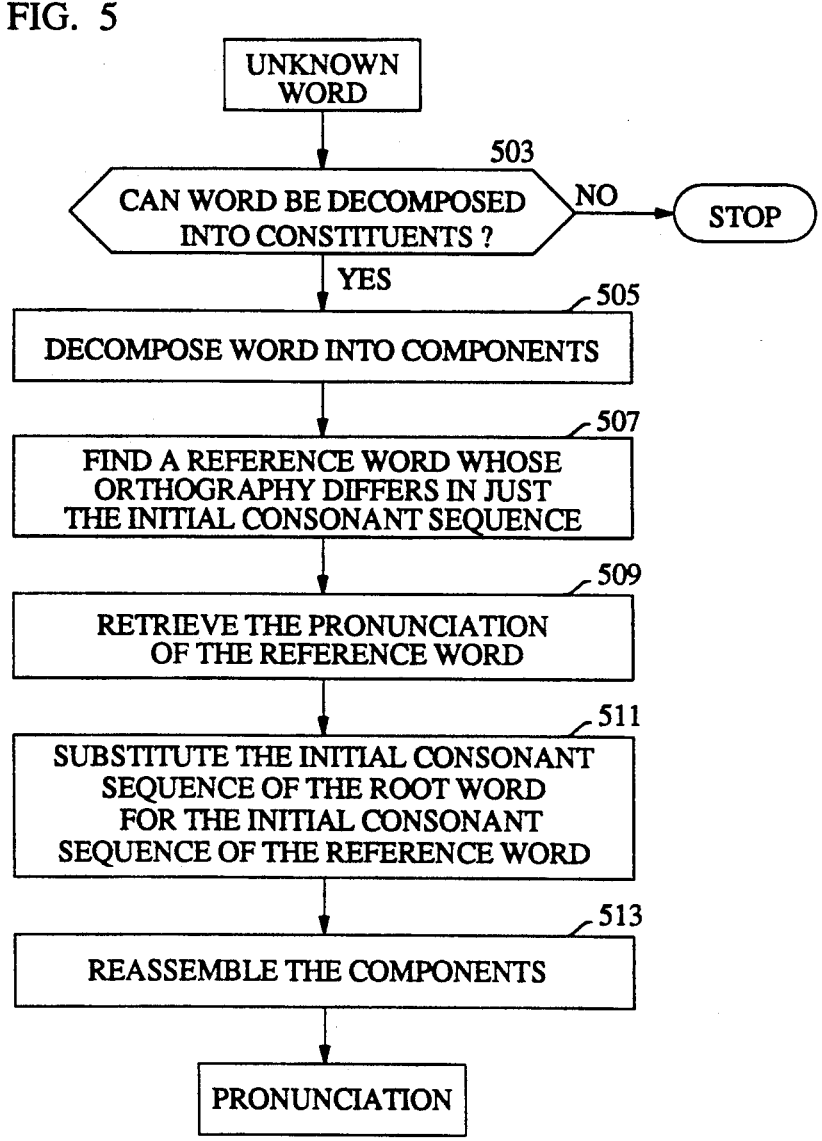

METHOD AND APPARATUS FOR SPEECH PROCESSING USING MORPHOLOGY AND RHYMING

BACKGROUND OF THE INVENTION

1. Field of the Invention

This invention relates to natural language processing in general, and more particularly, to methods and systems for speech synthesis and speech recognition.

2. Description of the Related Art

A speech synthesis system is a machine that accepts as input a text stream and provides as output a speech signal. One aspect of a speech synthesizer converts words into phonemes. A phoneme is a member of the set of the smallest units of speech that serve to distinguish one utterance from another in a language or dialect. The /p/ of pat and the /f/ of fat are two examples. Typically, the conversion from text to phonemes is performed either by looking the words up in a dictionary or by sounding them out from their orthography (e.g., spelling) according to set of phonetic principles. An excellent tutorial on the topic is D. H. Klatt, "Review of text-to-speech conversion for English," *J. Acoust. Soc. Am.*, Vol. 82(3), pp. 737-775 (Sept. 1987).

Both approaches have their advantages and disadvantages; the dictionary approach provides the highest quality output but fails for words (e.g., proper nouns) which are not in the dictionary. The rule-based approach is more comprehensive in its coverage but produces unacceptable results for irregular words. Today, most speech synthesizers use both approaches. The dictionary approach is utilized when possible, and the rule-based approach is used when the dictionary approach fails.

A speech recognition system is a machine that performs the inverse function of a speech synthesis system. It accepts as input a speech signal and outputs a text stream representing that speech. One aspect of a speech recognition system converts phonemes or sequences of phonemes into words. As in contemporary speech synthesis systems, this conversion is usually performed using the dictionary approach when possible and the rule-based approach otherwise.

SUMMARY OF THE INVENTION

The present invention provides, in a speech synthesis system, for the conversion of text representing words into phonemes by using an approach different from the prior art. Speech synthesized by the present invention is of a higher quality than that synthesized by conventional systems when comparable dictionaries are available to the respective systems. Additionally, the present invention provides an effective mechanism for synthesizing proper nouns.

These results are obtained in an illustrative embodiment of the present invention through a true hybrid of the dictionary and rule-based approaches. Another illustrative embodiment formulates the pronunciation for a word not found in the dictionary by rhyming the unrecognized word, or elements of the unrecognized word, with a word, or elements of a word in the dictionary. Yet another illustrative embodiment of the invention provides caller identification over a telephone network. And yet another illustrative embodiment of the invention provides an mechanism to allow speech-impaired persons to communicate with hearing-capable persons over a telephone network.

Another aspect of the present invention provides, in a speech recognition system, for the conversion of phonemes, or sequences of phonemes, into text by using an approach different from the prior art. Speech recognized by the present invention is more accurate than that synthesized by conventional systems when comparable dictionaries are available to the respective systems.

These results are obtained in illustrative embodiments of the present invention through a true hybrid of the dictionary and rule-based approaches. Another illustrative embodiment formulates the orthography for a word not in the dictionary by rhyming the unrecognized word, or elements of the word, with a word, or elements of a word, in the dictionary. Yet another illustrative embodiment of the invention provides a mechanism to allow speech-capable persons to communicate with hearing-impaired persons over a telephone network.

BRIEF DESCRIPTION OF THE DRAWING

FIG. 1 presents a flow chart representation of a method that utilizes rhyme analogy for the purpose of determining the pronunciation of an unknown word in a speech synthesis system in accordance with an illustrative embodiment of the invention.

FIG. 2 presents an illustrative portion of a dictionary, used by the method of FIG. 1, which portion shows words and their pronunciations indexed by their orthography.

FIG. 5 presents a flow chart representation of a method that utilizes both the method in FIG. 1 and morph analogy for the purposes of determining the pronunciation of an unknown word in a speech synthesis system in accordance with an illustrative embodiment of the invention.

FIG. 6 presents an illustrative portion of a dictionary, used by the method of FIG. 5, which portion shows words and their pronunciations indexed by their orthography.

Detailed Description

1. EMBODIMENTS USING RHYME ANALOGY

1.1. Introduction

As used in this description, the term "rhyme" should be understood in its broader meaning, i.e., correspondence in terminal sounds of a word, and correspondence in other than terminal sounds of a word. Thus, in particular, the term rhyme is not limited to applications to words that have a corresponding final sound and includes words which have correspondence in a sound.

To simplify the present disclosure and facilitate a better understanding of the various aspects of the present invention, the methods, techniques, algorithms and apparatus well known in the art will not be elaborated herein. Rather, the state of the art including that disclosed in the Klatt reference, supra, and references cited therein, will be used as a point of departure for discussing the present invention. Thus, e.g., such techniques for recognizing words, and sequences of characters making comparisons with stored references, e.g., dictionaries, and generating sound based on identified words, phonemes and other speech elements are taken as well known. See "Readings in Speech Recognition," Alex Waibel & Kai-Fu Lee, Editors, Morgan Kaufmann Publishers, Inc., 1990, and J. Allen, S. Hunnicutt, and D. H. Klatt, "From Text to Speech: The MITalk System," Cambridge University Press, Cambridge, U.K. (1987).

Figures 3, 4:
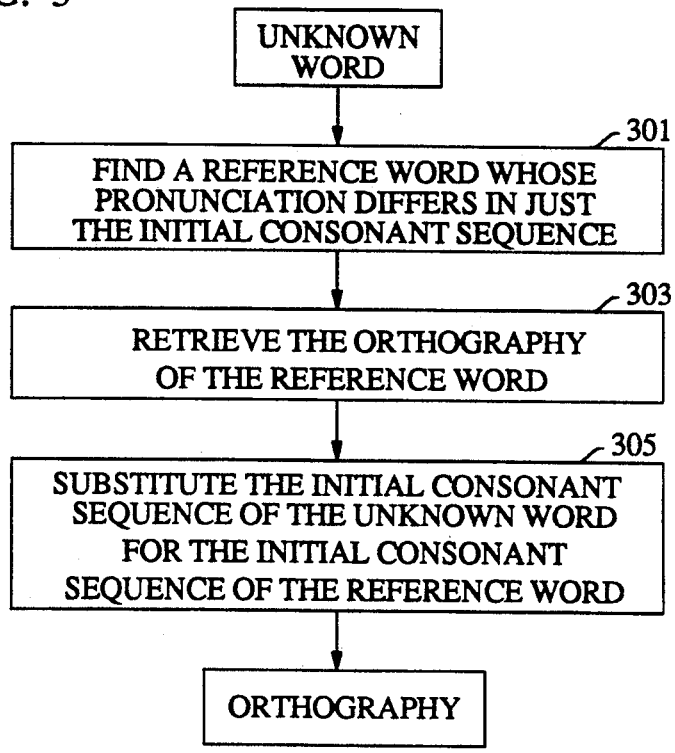
FIG. 3 presents a flow chart representation of a method that utilizes rhyme analogy for the purpose of determining the orthography of an unknown word in a speech recognition system in accordance with an illustrative embodiment of the invention.
FIG. 4 presents an illustrative portion of a dictionary, used by the method of FIG. 3, which portion shows words and their pronunciations indexed by their pronunciation.

The dictionaries in FIGS. 2, 4 and 6 and the detailed description use the phoneme notation adopted by *Webster's Ninth New Collegiate Dictionary* 42 (9th ed. 1983), except that the symbol /ē/ represents the schwa. For pedagogical reasons the dictionaries in FIGS. 2, 4 and 6 only have six entries. It should be clear to one having ordinary skill in the art how to implement embodiments of the invention using alternate phoneme notations and more complete dictionaries.

1.2. Speech Synthesis

FIG. 1 presents a flowchart representation of a method in accordance with one embodiment of the invention. This method advantageously utilizes rhyme analogy in speech synthesis systems to convert text representing words to phonemes. The embodiment presupposes the existence of a dictionary of a type shown in illustrative portion in FIG. 2.

The first column 201 of the dictionary in FIG. 2 is an orthographic index of each word in the dictionary and the second column 202 is the corresponding pronunciation for each orthographic entry. For example, according to the dictionary in FIG. 2 the pronunciation of starve is /'stärv/.

Suppose that a speech synthesis system is required to create a speech signal for the word crash but that there is no entry for crash in its dictionary. Nevertheless, a hybrid approach in accordance with an aspect of the present invention, using the dictionary in FIG. 2 and certain rules, may be used to determine the pronunciation. For example, the pronunciation of crash might be determined through the hybrid approach of rhyming. FIG. 1 shows the method involved in one embodiment of a rhyme analogy method.

In accordance with step 101 of FIG. 1, the dictionary of FIG. 2 is searched for a word whose trailing orthography differs from crash in just the initial consonant sequence /cr/. Upon inspection, it is found that the dictionary includes an entry for the word stash and that stash differs from crash only in the initial consonant sequence. Pursuant to step 103 the dictionary's entry for the pronunciation of stash is retrieved and found to be /'stash/. As directed by 105 the pronunciation of crash is determined by replacing the initial consonant sequence of /'stash/ (/st/) with the initial consonant sequence of crash (/cr/). Accordingly, the pronunciation of the word crash is determined to be /'crash/.

1.3. Speech Recognition

FIG. 3 presents a flowchart representation of an illustrative embodiment of the present invention that utilizes rhyme analogy in speech recognition systems. The embodiment presupposes the existence of a dictionary of the type shown in illustrative portion in FIG. 4. The first column 401 of the dictionary is an index based on pronunciation and the second column 402 is the corresponding orthography for the entry.

Suppose that a speech recognition unit "hears" the word /'plät-skē/ but does not have a entry for the word in its dictionary. Nevertheless the rhyme analogy method illustrated in FIG. 3 might be able to determine the orthography. As directed by 301 the dictionary of FIG. 4 is searched for a reference word whose pronunciation differs from /'plät-skē/ in just the initial consonant sequence /pl/. Upon inspection it is found that the dictionary includes an entry for the word /'trät-skē/ and that it differs from /'plät-skē/ only in that the initial consonant sequence is /tr/ instead of /pl/. Substituting the initial consonant sequence /pl/ for /Tr/ the orthography for /'plät-skē/ is determined to be Plotsky.

2. RHYME/MORPH ANALOGY

FIG. 5 presents an embodiment of the invention that utilizes a combination of rhyme analogy and morph analogy to determine the pronunciation of words not within the dictionary of a speech synthesis unit. This embodiment, like the others, presupposes the existence of the dictionary shown in FIG. 6. Like the dictionary of FIG. 2 the first column 601 is an orthographic index and the second column 602 is the corresponding pronunciation for the respective orthographic entry.

Suppose that a speech synthesis unit is required to create a speech signal for the word Fackelman and that there are no entries for Fackelman in its dictionary. Suppose further that a rhyme analogy method in FIG. 1 provides an unsatisfactory pronunciation because there are no entries which have a trailing orthography of —ackelman. Nevertheless, the rhyme analogy method of FIG. 1 may be modified, as shown in FIG. 5, to incorporate morph analogy so as to be capable of determining the pronunciation. Accordingly, those skilled in the art will recognize that a nested application of rhyme analogy and morph analogy, as shown in FIG. 5 may prove advantageous in some circumstances.

Referring to FIG. 5 at 503 it must be determined whether the unknown word Fackelman can be decomposed into components such that the pronunciation of each component can be determined and the whole reassembled. As known in the art there are a number of ways that a word can be broken down into its constituents. For example, root+stress neutral suffix (e.g., abandons=abandon+s), root+primary stress ending (e.g., addressee=address+ee), root+ity class ending (e.g., abnormality=abnormal+ity), stress neutral prefix+root (e.g., profound=pro+found), compounds (e.g., armrest=arm+rest). It should be clear to a person of ordinary skill in the art how to find and decompose words according to these and other morphological methods.

On examination, Fackelman has a stress neutral suffix man such that it can be decomposed into Fackel and man. Steps 507, 509 and 511 require that the rhyming technique of FIG. 1 be applied to the root Fackel. By rhyme analogy the pronunciation of Fackel is found from Crackel and is determined to be /'fak-ēl/. Accordingly, Step 513 assembles the pronunciations corresponding to the constituents identified earlier. Therefore the pronunciation of the suffix man is to be appended to the pronunciation of Fackelman. Assuming that the pronunciation of man is /men/, the pronunciation of Fackelman is determined to be /'fak-ēl-men/.

3. TOOLS FOR THE DEAF

Figure 7:
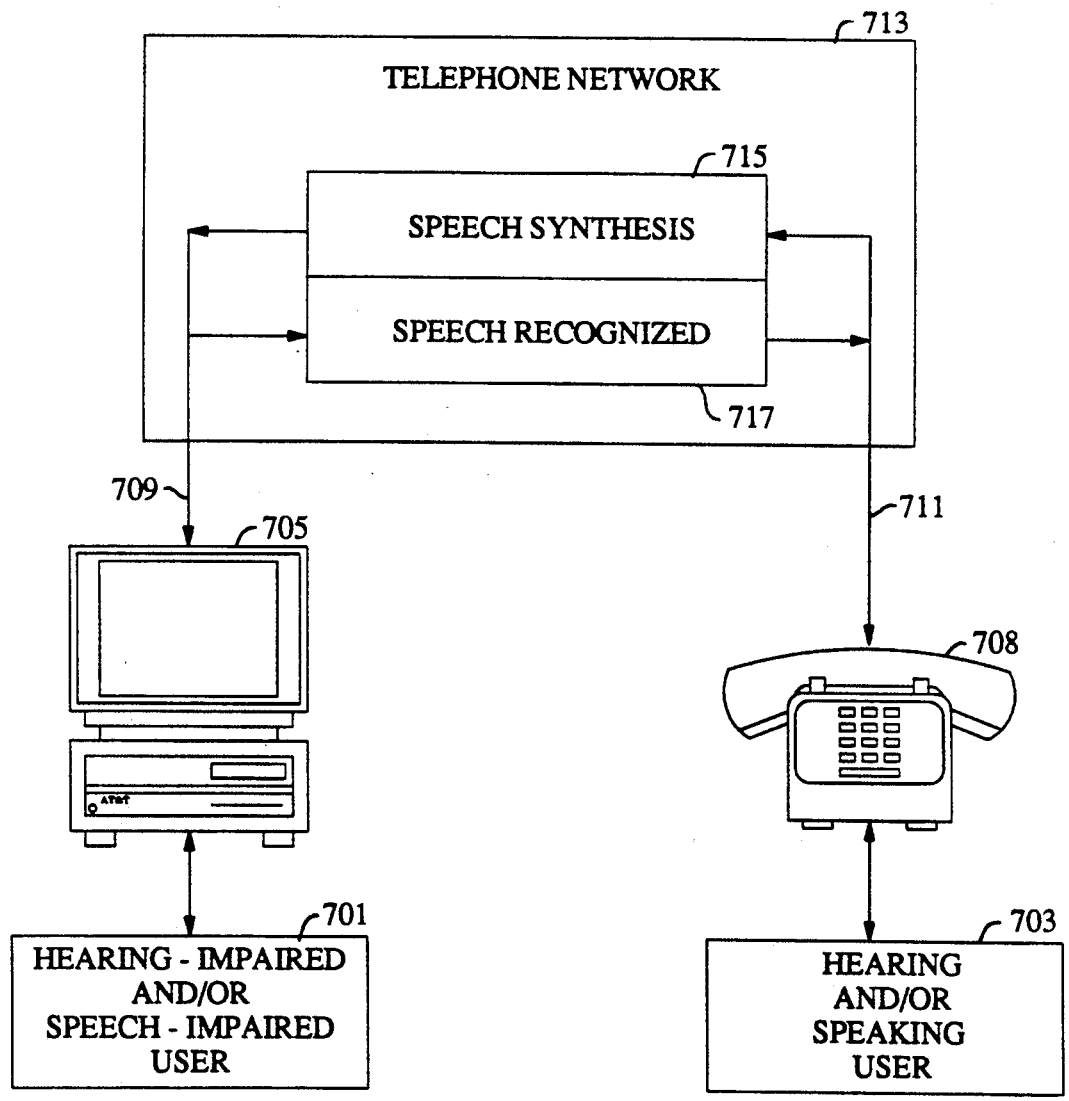
FIG. 7 presents an illustrative embodiment of the invention that permits hearing-impaired and/or speech-impaired persons to communicate with hearing-capable and/or speech-capable persons over a telephone network.

FIG. 7 presents an embodiment of the invention that permits hearing-impaired and/or speech-impaired persons to communicate with hearing-capable and/or speaking-capable persons over a telephone network. Referring to FIG. 7, a hearing-impaired and/or speech-impaired user 701 has access to a computer terminal 705. The user 701 transmits information by typing in English on the computer's 705 console. The computer transmits the typed text over a telephone line 709 into a telephone network 713 and to a system for speech synthesis 715 in accordance with techniques well known in the art. The system 715, incorporating the rhyme analogy and rhyme/morph analogy methods described above, converts the typed text into a speech signal. The speech signal is sent from the system 715 over the telephone network 713 and a telephone line 711 to a conventional telephone 707. The telephone 707 turns the speech signal into audible sound where it can be heard by the hearing-capable user 703.

The speaking-capable user 703 speaks into the telephone 707 where his or her audible speech is turned into a speech signal. The speech signal is transmitted over the telephone line 711 to the telephone network 713 and to a system for performing speech recognition 717 in accordance with techniques well known in the art. The system 717, incorporating the rhyme analogy and rhyme/morph analogy methods, converts the speech signal into English text. The English text is transmitted over the telephone network 713 and the telephone line 709 to the computer 705. The computer 705 displays the English text on the screen where it can be read by the user 701.

As will be clear to those skilled in the art, the present invention in its various embodiments can be implemented as a computer program operating on a general purpose data processor. In other applications, embodiments will be implemented using special purpose hardware or combinations of special purpose hardware and programmed general purpose processors.

4. CALLER IDENTIFICATION

Figure 8:
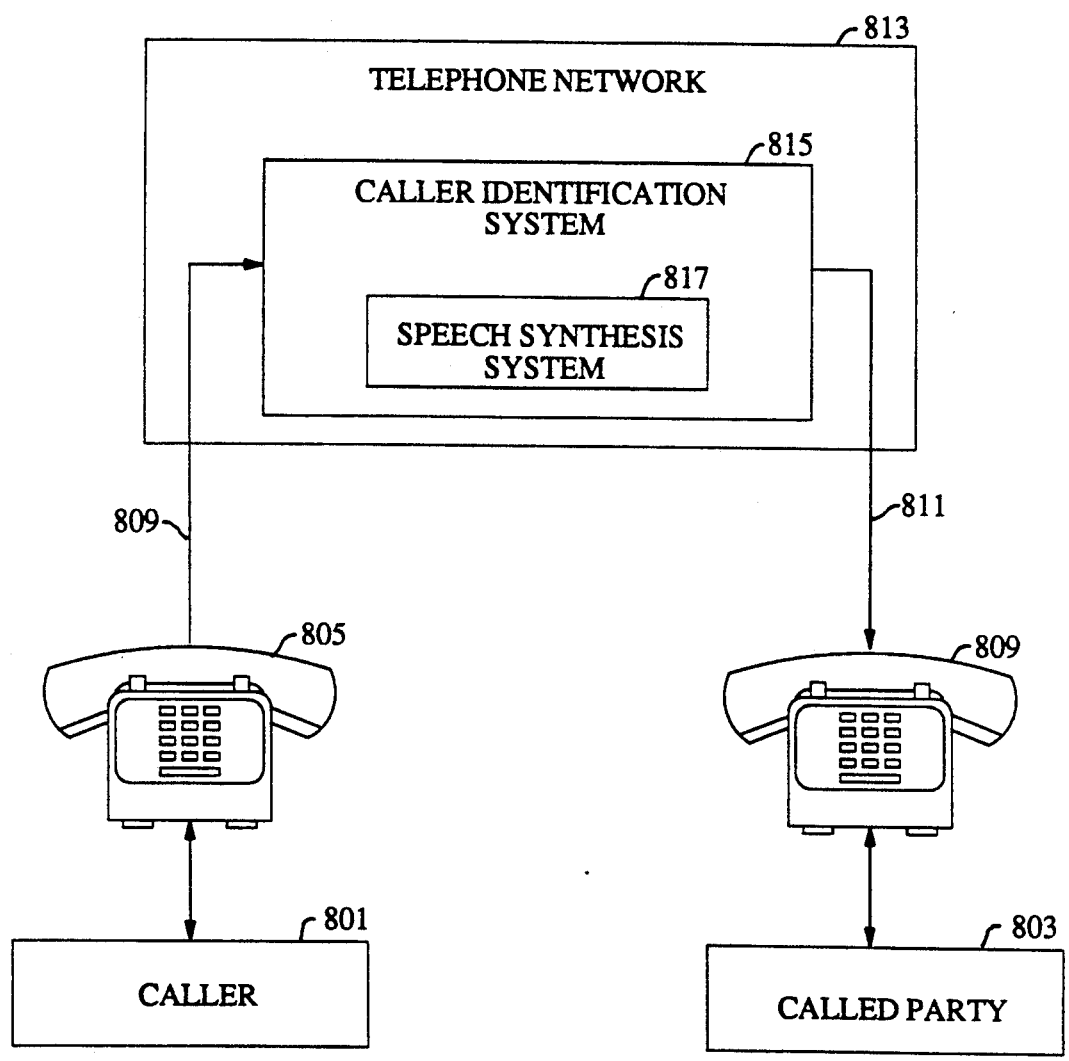
FIG. 8 presents an illustrative embodiment of the invention that provides caller identification services in a telephone network.

FIG. 8 presents an embodiment of the invention that informs the called party of a telephone call of the identity of the calling party and/or of the identity of the telephone from which the call originates. Referring to FIG. 8, a caller 801 uses a telephone 805 to place a telephone call over the telephone line 807 into a telephone network 813. Under various conditions, including all of the time, the call is routed through a caller identification system 815 and on to normal processing. The call proceeds over telephone line 811 and to telephone 809. When a called party 803 answers the telephone 809, the caller identification system 815, via the speech synthesis system 817, audibly informs the called party 803 of the identity of the calling party 801, and/or the identity of the telephone 805 from which the call is originating. The speech synthesis system 817 incorporates the illustrative embodiment of the invention shown in FIG. 5. When the caller identification system 815 has identified the caller 801 to the called party 803, the caller identification system 815 drops out of the call and the called party 803 can elect whether or not to continue the call.

As will be clear to those skilled in the art, the present invention in its various embodiments can be implemented as a computer program operating on a general purpose data processor. In other applications, embodiments will be implemented using special purpose hardware or combinations of special purpose hardware and programmed general purpose processors.

We claim:

1. In a machine, a method for determining an orthography of a first word having a known pronunciation, the method comprising the steps of:

locating a reference word which has a known pronunciation and a known orthography such that a subset of said pronunciation of said reference word is a subset of said pronunciation of said first word; and determining said orthography of said first word by rhyme analogy to said orthography of said reference word.

2. An apparatus for determining an orthography of a first word given its pronunciation, said system comprising:

means for locating a reference word which has a known pronunciation and a known orthography such that a subset of said pronunciation of said reference word is a subset of said pronunciation of said first word; and means for determining said orthography of said first word by rhyme analogy to said orthography of said reference word.

3. A method for determining an orthography of a first word which has a known pronunciation, the method comprising the steps of:

locating a reference word which has a known pronunciation and a known orthography and which has a trailing pronunciation that is substantially similar to a trailing pronunciation of said first word; and determining said orthography of said first word by rhyme analogy to said orthography of said reference word.

* * * * *